United States Patent
Korba et al.

(10) Patent No.: US 7,149,637 B2
(45) Date of Patent: Dec. 12, 2006

(54) DETECTING ELECTROMECHANICAL OSCILLATIONS IN POWER SYSTEMS

(75) Inventors: Petr Korba, Nussbaumen (CH); Mats Larsson, Baden (CH); Christian Rehtanz, Dättwil (CH)

(73) Assignee: ABB Research Ltd, Zurich (CH)

( * ) Notice: Subject to any disclaimer, the term of this patent is extended or adjusted under 35 U.S.C. 154(b) by 62 days.

(21) Appl. No.: 10/871,685

(22) Filed: Jun. 18, 2004

(65) Prior Publication Data

US 2005/0187726 A1 Aug. 25, 2005

(30) Foreign Application Priority Data

Jun. 21, 2003 (EP) .................................. 03405450

(51) Int. Cl.
*G06F 17/00* (2006.01)

(52) U.S. Cl. ............................ 702/60; 702/57; 702/75; 703/18

(58) Field of Classification Search ............ 702/57–60, 702/64, 65, 66, 69, 67, 75, 76, 115, 124, 182, 702/183, 185, 187, 189, 190, 196; 324/500, 324/522, 76.39, 142, 771; 703/18, 13; 700/293, 700/294

See application file for complete search history.

(56) References Cited

U.S. PATENT DOCUMENTS

| | | | | |
|---|---|---|---|---|
| 4,051,427 A | * | 9/1977 | Kilgore et al. ................. | 322/99 |
| 4,741,023 A | | 4/1988 | Lawson ................... | 374/106.01 |
| 5,566,092 A | * | 10/1996 | Wang et al. ................. | 702/185 |
| 6,104,182 A | * | 8/2000 | Jurisch et al. ............... | 324/142 |
| 6,476,521 B1 | | 11/2002 | Lof et al. .................... | 307/105 |
| 6,778,919 B1 | * | 8/2004 | Holbach et al. .............. | 702/59 |
| 6,937,945 B1 | * | 8/2005 | Golder et al. ................. | 702/60 |
| 2002/0103629 A1 | * | 8/2002 | Kutzner et al. ................ | 703/7 |
| 2004/0102937 A1 | * | 5/2004 | Ibrahim ........................ | 703/2 |

OTHER PUBLICATIONS

M. Hori et al., "Electromagnetic Guidance Control by Use of Kalman Filter State Estimation", Power Conversion Conference 1993, New York, New York, USA, Apr. 19-21, 1993, pp. 702-707..
J.H. Park et al., "Composite Modeling for Adaptive Short-Term Load Forecasting", IEEE Transactions on Power Systems, New York, USA, vol. 6, No. 2, pp. 450-457, May 1991.
M. Hemmingsson et al., "Estimation of Electro-Mechanical Mode Parameters using Frequency Measurements", IEEE 2001, pp. 1172-1177, no month.
D.G. Hart et al., "PMUs—A new approach to power network monitoring", ABB Review Jan. 2001, pp. 58-61.
Korba, P. et al., "Detection of Oscillations in Power Systems Using Kalman Filtering Techniques." IEEE, Jun. 2003, pp. 183-188.

* cited by examiner

*Primary Examiner*—Hal Wachsman
(74) *Attorney, Agent, or Firm*—Buchanan Ingersoll PC

(57) ABSTRACT

The detection of electromechanical oscillations in power systems and the estimation of their frequency and damping parameters are based on a linear time-varying model. The parameters of the linear model are on-line adapted by means of Kalman filtering techniques to optimally approximate the measured signal representing the behavior of the power system based on a quadratic criterion. The estimated model parameters are then the basis for the calculation of parameters of the oscillations. Adaptive algorithms are based on a recursive calculation of the estimated parameter vector for each time-step based on the new value of the measured signal and the old values of the estimated parameters.

10 Claims, 2 Drawing Sheets

DETECTING ELECTROMECHANICAL OSCILLATIONS IN POWER SYSTEMS

FIELD OF THE INVENTION

The invention relates to the field of electric power transmission networks interconnecting a plurality of generators.

BACKGROUND OF THE INVENTION

In the wake of the recent and still ongoing deregulations of the electric power markets, load transmission and wheeling of power from distant generators to local load consumers has become common practice. As a consequence of the competition between utilities and the emerging need to optimize assets, substantially increased amounts of power are transmitted through the existing networks, invariably causing transmission bottlenecks and oscillations of parts of the power transmission systems.

Interconnected alternating current generators remain in synchronism because of the self-regulating properties of their interconnection. Hence, if a first generator deviates from its synchronous speed, power is transferred from the other generators in the system in such a way that the speed deviation is reduced. Since moments of inertia of the generators also come into play, this results typically in speed over-corrections and the whole system or a part thereof starts swinging in the same manner as a set of interconnected pendulums. In general, these electromagnetic oscillations with a frequency of less than a few Hz are stable and considered acceptable as long as they decay. They are initiated by the normal small changes in the system load, and they are a characteristic of any power system. However, an increase in the transmitted power of a few MWs may make the difference between stable oscillations and unstable oscillations which have the potential to cause a system collapse or result in lost of synchronism, lost of interconnections and ultimately the inability to supply electric power to the customer.

An operator can control the power that the generators should supply under normal operating conditions and automatic control mechanisms are responsible for fast adjustments which are necessary to maintain the system voltages and line frequency (e.g. 50 Hz) within design limits following sudden changes in the system. These controls are necessary for any interconnected power system to supply power of the required quality. However there is no warning to the transmission operator if a new operating condition causes the abovementioned oscillatory modes to become lightly damped and thus potentially dangerous. Appropriate monitoring of the power system can help the operator to accurately assess power system states and avoid a total blackout by taking appropriate actions such as the connection of specially designed damping equipment.

In the article "Estimation of Electro-Mechanical Parameters using Frequency Measurements" by M. Hemmingsson, O. Samuelsson, K. O. H. Pedersen and A. H. Nielsen, IEEE 2001, 0-7803-6672-7 (p. 1172) information about electromechanical mode parameters such as oscillation frequency and damping have been extracted from measurements made at a 230V wall-outlet during normal operation of The power system. Batches of measurements of the line frequency were taken, each lasting for a time window of at least 10 min, and subsequently analyzed. Spectral analysis of the instantaneous frequency revealed two well known electromechanical modes oscillating at 0.35 Hz and 0.57 Hz. A pole estimation procedure based on a stationary, time discrete model driven by white noise allowed to approximate the corresponding damping of the two modes. Due to the batch sampling technique, no on-line or real-time analysis of the power system was possible.

Electric power transmission and distribution systems or networks comprise high-voltage tie lines for connecting geographically separated regions, medium-voltage lines, and substations for transforming voltages and for switching connections between lines. For managing the network, time-stamped local information about the network, in particular currents, voltages and load flows, can be provided by newly installed Phasor Measurement Units (PMU), c.f. the article "PMUs—A new approach to power network monitoring", ABB Review 1/2001, p. 58. A plurality of phasor measurements collected from throughout the network at a central data processor in combination provide a snapshot of the overall electrical state of the power system.

DESCRIPTION OF THE INVENTION

It is therefore an objective of the invention to enable an operator of an electric power transmission network to identify in real-time electromechanical oscillations. Various exemplary method, system and computer program for detecting electromechanical oscillations in power systems are disclosed.

According to the invention, a system quantity or signal such as e.g. amplitude or angle of the voltage or current at a selected node of the network is sampled, i.e. measured at discrete time intervals, and a series comprising several of the measured values of said system quantity is generated. From this series, the parameters of a parametric model representing the behaviour of a power transmission system, or a particular aspect thereof, are estimated. This process is carried out in an adaptive manner, i.e. every time a new value of the system quantity is measured, the parameters of the model are updated recursively. Finally, from the estimated parameters of the model, the parameters of the oscillatory modes are computed, and in particular, their oscillation frequency and damping properties are quantified. The inventive process enables an almost instantaneous analysis of the state of the power system as compared to a non-adaptive identification process relying on the analysis of sampled data collected over a time-window of several minutes and evaluated only at the end of this time-window.

In a preferred variant of the proposed approach, the parameters of the parametric model which fit best the measured values of the system quantity are estimated subject to an optimization criterion. Further, the model is assumed to predict the next sampled value of the system quantity, based on a time series containing a linear combination of a finite number of n previous measured values. Such a model is called linear autoregressive, with the integer n denoting its dynamical order as well as the number of parameters to be estimated. It has the advantage of the simple form of a linear difference equation containing only n parameters and additionally is suitable to represent frequency spectra with narrow peaks.

According to a preferred variant of the invention, recursive or adaptive techniques such as recursive least square (RLS) or adaptive Kalman filtering are used to determine the parameters of the parametric model. The standard adaptive Kalman filtering algorithm can be advantageously enhanced by enforcing symmetry of the covariance or correlation matrix of the estimation error, thus increasing numerical robustness of the procedure.

To obtain the parameters of the oscillations, the discrete-time linear autoregressive model is preferably converted to its continuous-time form. This may be done using some known transformation techniques and providing a known and constant sampling period. Tustin's bilinear transformation has proven to be the most suitable transformation technique for the abovementioned conversion. The reason for this resides in the fact that it converts the unit circle in the z-plane into the left half of the s-plane. Hence, stable discrete-time systems are transferred into stable continuous-time systems, of which the eigenvalues, i.e. the solutions of the characteristic equation (or poles if considering the transfer function) form the basis for a calculation of the studied oscillations. In other words, the parameters of the continuous-time model yield directly the desired information about the oscillations.

In a preferred embodiment of the invention, the mode information about a critical oscillation, which is typically the dominant oscillatory mode having the lowest damping, is updated on a suitable time scale (which may be longer than the actual sampling rate) and presented to the operator. Optionally, the updated damping factor is compared to threshold values representing save or hazardous operation regimes, and the operator adjusts the transmitted power and thus optimally exploits the transmission resources.

The observability of even the dominant oscillatory modes depends on the location or node of the network. Therefore, if a nominal model of the power system is available, modal analysis can be carried out to select optimally the best system quantity or signal to measure (or to place the phasor measurement unit) with respect to the observability of the oscillatory mode of interest.

Instead of an on-line estimation of oscillation mode parameters as set forth above, a set of measured or simulated values of the system quantity may serve to compare different model systems. Such an off-line process may lead to the identification of suitable model systems and/or system variables like the order n or number of parameters in the abovementioned AR model and thus contribute to the synthesis of future controllers.

BRIEF DESCRIPTION OF THE DRAWINGS

The subject matter of the invention will be explained in more detail in the following text with reference to preferred exemplary embodiments which are illustrated in the attached drawings, of which.

The reference symbols used in the drawings, and their meanings, are listed in summary form in the list of reference symbols. In principle, identical parts are provided with the same reference symbols in the figures.

DETAILED DESCRIPTION OF PREFERRED EMBODIMENTS

Figure 1:
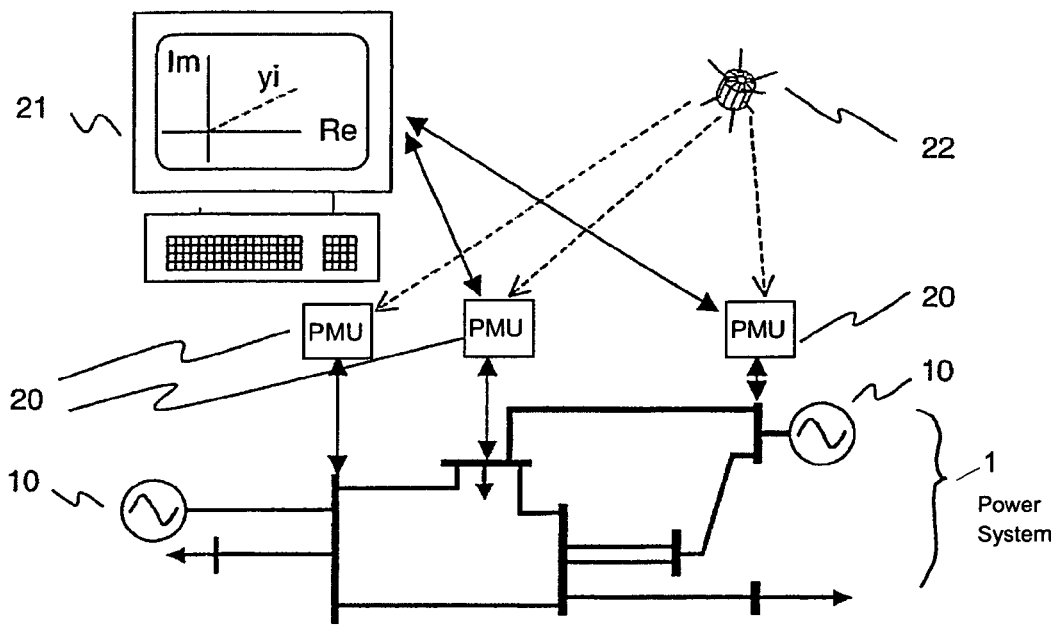
FIG. 1 schematically shows a power system and wide area monitoring system.

FIG. 1 shows an overview of a power system 1 including two generators 10 as well as a wide area monitoring system. The latter comprises three phase measurement units (PMUs) 20 residing, for example, at a feeder at the bay level of substations or at branching points along transmission lines of the power system. The PMUs provide fast sampled phasor snapshots of the power system in the form of magnitudes, phase angles or even phase angle differences of system quantities $y_i$ such as voltages or currents. Correspondingly, the phasor data may be a complex or polar number, the absolute value of which corresponds to either the real magnitude or the RMS value of the system quantity, and the phase argument to the phase angle at zero time. By contrast, conventional sensing devices used in power networks generally measure only scalar, average representations, such as the RMS value of a voltage, current or power flow. The signals are transmitted and collected centrally in a wide-area monitoring centre 21.

If the phasor data from disparate sources, often separated by hundreds of kilometres, are analysed in conjunction, they must refer to a common phase reference. Therefore, the different PMUs must have local clocks that are synchronised with each other to within a given precision. Such a synchronisation of is preferably achieved with a known time distribution system, for example the global positioning (GPS) system 22. In a typical implementation, the phasor data is determined at least every 100 milliseconds, with a temporal resolution of preferably less than 1 millisecond. Each measurement is then associated with a time stamp derived from the synchronised local clock.

Figure 2:
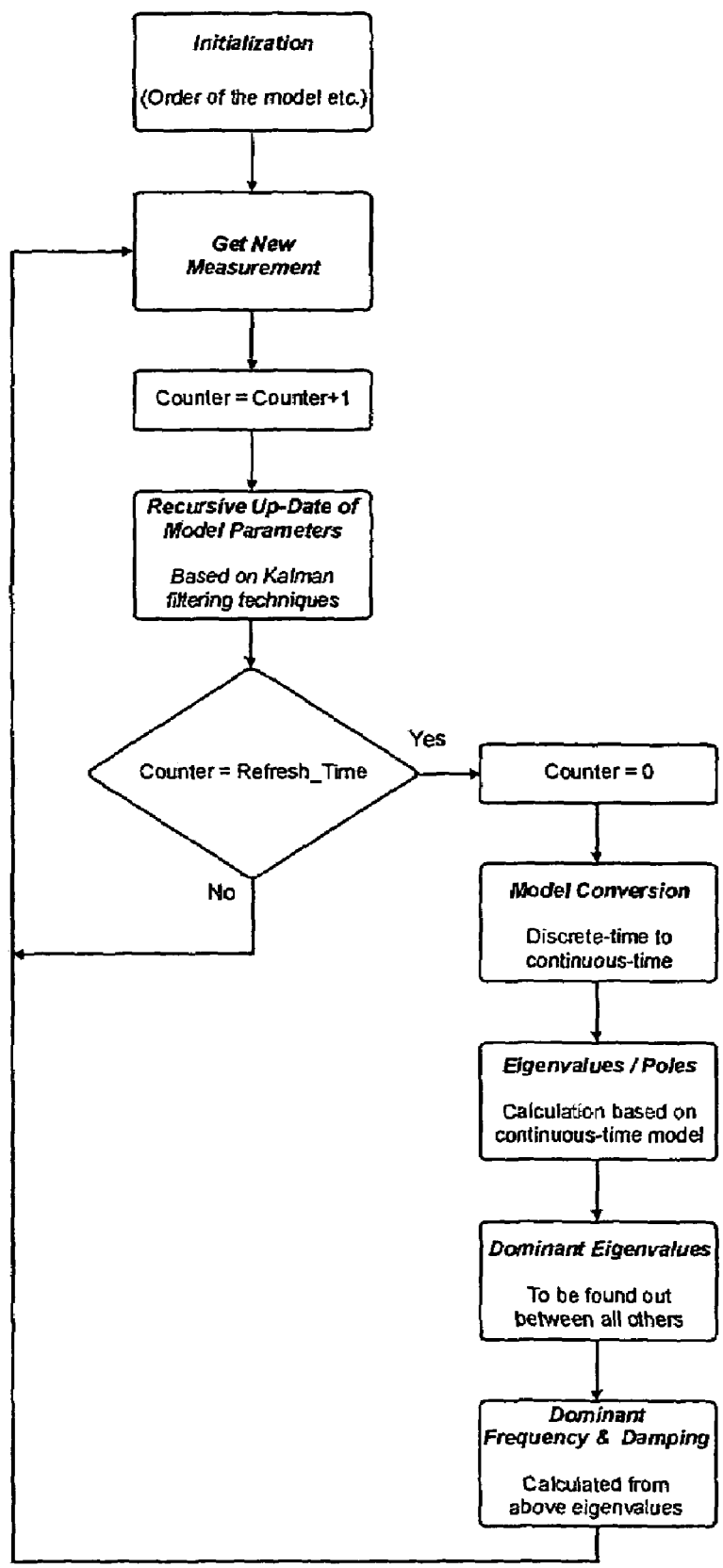
FIG. 2 is a flowchart according to the inventive process.

FIG. 2 depicts the basic algorithm for the detection of power system oscillations which is explained below. A full account on the mathematical details can be found in the article "Detection of Oscillations in Power Systems using Kalman Filtering Techniques", P. Korba, M. Larsson, C. Rehtanz, IEEE (June 2003). As a first step, all parameters used for recursive calculations must be initialized and the dynamical order (n) of the discrete-time autoregressive model (where n stands for the number of parameters to be estimated) must be determined. The latter task can be systematically solved off-line in advance based on a given set of real measured data using well-known criteria such as AIC (Akake's Information Criterion), FPE (Final Prediction Error) or MDL (minimal description length).

The selection of the order n is the most important aspect of the use of the autoregressive model. If the order is too low, the obtained spectrum in the frequency domain will be highly smoothed, and the oscillation of interest with low-level peaks in the spectrum are dissimulated. On the other hand, if the order is too high, faked low-level peaks will be introduced in the spectrum.

Sampling a new measurement stands for storing the new measured data in a buffer having only the length n. The next step of the algorithm consists of solving recursively the optimal identification problem of the model parameters $a_i$ by means of the adaptive Kalman-Filter. In the linear autoregressive model, the time series for the predicted value $\hat{Y}$ (as opposed to the measured value) of the system quantity y at measurement or iteration time k is written as $$\hat{y}(k \mid k-1) = \sum_{i=1}^{n} a_i y(k-i), \text{ rewritten also as}$$

$$y(k) = \sum_{i=1}^{n} a_i y(k-i) + \varepsilon(k) \text{ where } \varepsilon(k) = \hat{y}(k \mid k-1) - y(k)$$

where $y(k-i)$ are the buffered samples, $a(k)$ is the vector of the model parameters $a(k)=[a_1(k), \ldots, a_n(k)]$ to be estimated at iteration time k, and $\varepsilon(k)$ is the estimation error at step k.

The latter is to be minimized via the sum of squared prediction errors as a function of the model parameters $a_i$:

$$J = \min_{a_i} \sum \varepsilon^T \varepsilon = \min_{a_i} \sum (\hat{y}(k|k-1) - y(k))^2$$

This is done recursively, taking further into account the correlation matrix K(k) of the estimation error, the Kalman gains g(k) and the correlation matrix of the measurement noise $Q_m$ or process noise $Q_p$, wherein $Q_m$ and $Q_p$ represent rather insensitive tuning parameters. For the sake of numerical robustness, the above standard adaptive filtering algorithm can be enhanced by adding the following step:

$$K(k) = \frac{K(k) + K^T(k)}{2}$$

This equation enforces the symmetry of the matrix K at each iteration step, which otherwise is not automatically guaranteed anywhere in the recursive procedure above.

Unlike the recursive equations of the Kalman-Filter, where the estimates are updated as soon as new measured data are available, all the remaining steps need to be carried out only once per "Refresh_Time" period. The latter is specified in advance or during operation according to the actual slowness/fastness of the time-varying system (e.g. every 5 sec instead of once per sampling period which is typically 0.1 sec) to calculate and display the parameters of the oscillations (damping and frequency) out of the estimated model parameters.

For the purpose of calculating the damping and frequency of the dominant oscillations, the most suitable conversion of the estimated linear discrete-time autoregressive model of the power system to a continuous-time model is Tustin's approximation. This choice has the advantage that the left half-s-plane (s being the time continuous variable) is transferred into the unit-disc in z-plane (z being the time discrete variable of the time discrete model). Hence, stable discrete-time systems are transferred into stable continuous-time systems whose eigenvalues $\lambda_i$ (or poles if considering the transfer function) are obtained as a solution of the characteristic equation of the continuous-time model A(s)=0 and form the basis for calculation of the studied oscillations.

The most important oscillations to detect regarding stability are the dominant ones. They are characterized by complex eigenvalues having the largest real part of all. Hence, in this step, the dominant eigenvalue pair is searched for in the set of all n eigenvalues calculated in the previous step. Finally, in the last step, the parameters characterizing quantitatively the oscillations of interest, such as frequency $f$ and relative damping $\xi$, are simply calculated from the complex dominant eigenvalue pair $\lambda_i = \alpha_i \pm i\,\omega_i$ as follows:

$$\xi = -100 \frac{\alpha_i}{\sqrt{\alpha_i^2 + \omega_i^2}} [\%]$$

$$f = \frac{|\omega_i|}{2\pi} [Hz]$$

Figure 3:
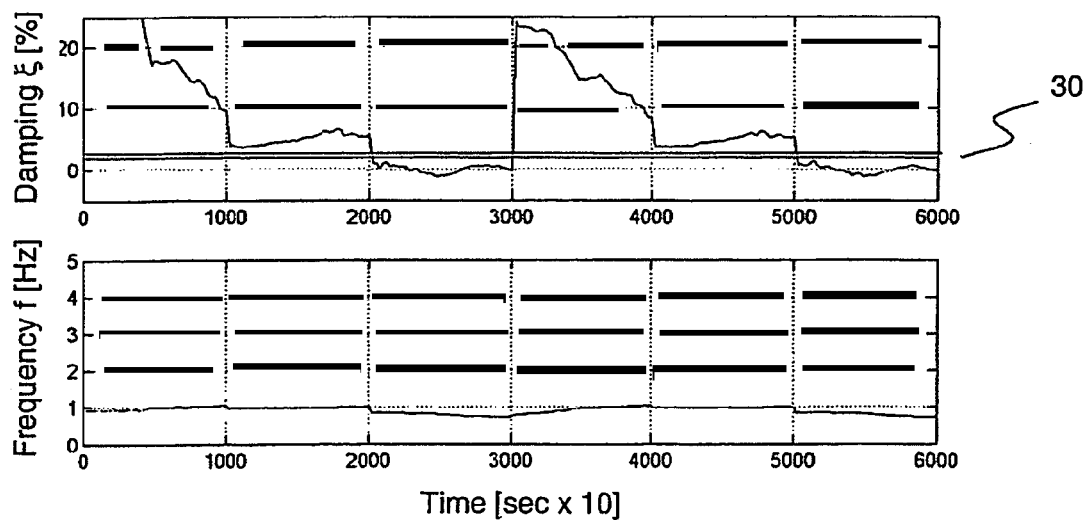
FIG. 3 depicts the real-time dependence of a dominant oscillation mode.

In a normally working power system (stable dynamic system) they usually satisfy the following inequalities. $\xi < 10\%$, $f < 2$ Hz The detection of a negative or very small positive damping indicates that the system is (getting) unstable. This fact together with the corresponding values of frequency and damping are displayed to the operator. A simple signalization based on a comparison of the actual calculated value with a threshold value can be included. By way of example, based on reduced nominal model of a real power system, modal analysis was applied to identify a suitable system quantity corresponding to a signal of the phase angle of the current at a particular location. FIG. 3 shows, as a function of time, the damping (top) and frequency (bottom) of a system oscillation. Every 100 sec, a transmission line was connected or disconnected, giving rise to a change in the oscillation pattern. Horizontal lines represent an alarm threshold 30 and are connected to some alarm mechanism.

In case of low signal to noise ratio, e.g. in case of a sensor fault, the incoming measured signal may temporarily consist of noise with a mean value close to zero rather than of realistic data. It is then advantageous to consider all measurements to equal exactly zero, otherwise the dominant frequency of the noise is estimated rather than the dominant frequency of the measured signal. Based on an observation of the average signal power, a threshold is fixed, and the estimated parameters will be frozen (not up-dated) if the actual signal power is lower than the threshold.

To identify oscillations in a power system, different physical signals can be used (voltages, currents, amplitudes, angles) as inputs to the proposed identification procedure. However, these signals differ with respect to their magnitudes and herewith also with respect to the signal power, signal-to-noise ratio, absolute values of the autocorrelation etc. Therefore, for the sake of simplicity with respect to tuning of parameters in the estimation procedure for different measured signals, each measurement can be multiplied by an amplifying constant depending on the system quantity or signal before putting into an input buffer. This simple normalization does not improve the quality of the measured signal, but it renders the tuning (finding the right parameters for initialization) of the identification algorithm easier when working with different signals in the same power system.

In summary, the detection of electromechanical oscillations in power systems and the estimation of their parameters (frequency $f$ and damping $\xi$) is based on a linear time-varying model. The parameters of the linear model are on-line adapted by means of Kalman filtering techniques to approximate the measured signal y (representing the behaviour of the power system) optimally in the sense of a quadratic criterion. The estimated model parameters are then the basis for the calculation of parameters of the oscillations. Adaptive algorithms are based on a recursive calculation of the estimated parameter vector for each time-step based on the new value of the measured signal and the old values of the estimated parameters. As opposed to the collection of data over a time window and then performing the parameter identification at once, any change in the system can thus be detected much faster.

LIST OF DESIGNATIONS

1 power system
10 generator
20 phase measurement units
21 wide-area monitoring centre
22 global positioning system
30 alarm threshold

The invention claimed is:

1. Method of detecting electromechanical oscillations in a power system, comprising
   a) measuring repeatedly a system quantity of the power system and generating a series of measured values of the system quantity,
   b) estimating model parameters of a discrete-time model of the power system from said series,
   c) deducing frequency and damping of an electromechanical oscillation mode of the power system from the model parameters, wherein the method comprises
   d) updating said model parameters every time a new value of the system quantity is measured.

2. The method according to claim 1, wherein the discrete-time model of the power system is a linear autoregressive model of finite order.

3. The method according to claim 2, wherein an adaptive Kalman Filter is used to estimate the model parameters of the linear autoregressive model.

4. The method according to claim 3, wherein a covariance matrix of the adaptive Kalman Filter is symmetrical.

5. The method according to claim 2, wherein a bilinear or Tustin transformation is used to convert the linear autoregressive model of finite order to a continuous-time model.

6. The method according to claim 1, wherein frequency and damping of the oscillation mode with lowest damping is updated regularly and displayed to an operator.

7. The method according to claim 1, wherein the frequency and damping of the oscillations are deduced from the model parameters less frequently than the model parameters updates.

8. The method according to claim 1, wherein the system quantity is a time stamped phasor signal provided by one phasor measurement unit.

9. An electric power transmission system including means for detecting electromechanical oscillations of the power system, comprising:
   a) means for repeatedly measuring a system quantity of the power system and generating a series of measured values of the system quantity,
   b) means for estimating, from said series, model parameters of a discrete-time model of the power system,
   c) means for deducing, from said model parameters, frequency and damping of an electromechanical oscillation mode of the power system, the means for detecting electromechanical oscillations of the power system comprising
   d) means for updating said model parameters every time a new value of the system quantity is measured.

10. A computer-readable medium for detecting electromechanical oscillations in electric power transmission systems, the computer-readable medium containing programming instructions which are loadable into an internal memory of a digital computer, the programming instructions comprising computer program code means to make the computer execute the steps of:
   a) measuring repeatedly a system quantity of the power system and generating a series of measured values of the system quantity;
   b) estimating model parameters of a discrete-time model of the power system from said series;
   c) deducing frequency and damping of an electromechanical oscillation mode of the power system from the model parameters; and
   d) updating said model Parameters every time a new value of the system quantity is measured.

* * * * *